United States Patent
Allen et al.

(10) Patent No.: US 10,380,262 B2
(45) Date of Patent: *Aug. 13, 2019

(54) DETECTING LITERARY ELEMENTS IN LITERATURE AND THEIR IMPORTANCE THROUGH SEMANTIC ANALYSIS AND LITERARY CORRELATION

(71) Applicant: International Business Machines Corporation, Armonk, NY (US)

(72) Inventors: Corville Orain Allen, Durham, NC (US); Scott Robert Carrier, Durham, NC (US); Eric Woods, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/055,625

(22) Filed: Aug. 6, 2018

(65) Prior Publication Data

US 2018/0349357 A1 Dec. 6, 2018

Related U.S. Application Data

(63) Continuation of application No. 14/094,889, filed on Dec. 3, 2013, now Pat. No. 10,073,835.

(51) Int. Cl.
*G06F 17/24* (2006.01)
*G06F 17/27* (2006.01)

(52) U.S. Cl.
CPC ........ *G06F 17/2785* (2013.01); *G06F 17/241* (2013.01)

(58) Field of Classification Search
None
See application file for complete search history.

(56) References Cited

U.S. PATENT DOCUMENTS

| | | | | |
|---|---|---|---|---|
| 2002/0022956 A1* | 2/2002 | Ukrainczyk | .......... | G06F 17/218 704/9 |
| 2004/0117189 A1* | 6/2004 | Bennett | .................. | G06F 17/27 704/270.1 |
| 2005/0257400 A1* | 11/2005 | Sommerer | ............ | G06F 16/954 36/13 |

(Continued)

OTHER PUBLICATIONS

IBM; "List of IBM Patents or Applications Treated as Related" (Appendix P).

(Continued)

*Primary Examiner* — Thuykhanh Le
(74) *Attorney, Agent, or Firm* — Robert H. Frantz; Mercedes L. Hobson

(57) ABSTRACT

Automatic semantic analysis for characterizing and correlating literary elements within a digital work of literature is accomplished by employing natural language processing and deep semantic analysis of text to create annotations for the literary elements found in a segment or in the entirety of the literature, a weight to each literary element and its associated annotations, wherein the weight indicates an importance or relevance of a literary element to at least the segment of the work of literature; correlating and matching the literary elements to each other to establish one or more interrelationships; and producing an overall weight for the correlated matches.

18 Claims, 4 Drawing Sheets

(56) References Cited

U.S. PATENT DOCUMENTS

| | | | |
|---|---|---|---|
| 2008/0275694 A1* | 11/2008 | Varone | G06F 17/2785 704/9 |
| 2010/0161316 A1* | 6/2010 | Haug | G06F 17/2715 704/9 |
| 2010/0228693 A1* | 9/2010 | Dawson | G06F 17/2705 706/12 |
| 2010/0235165 A1* | 9/2010 | Todhunter | G06F 16/3329 704/9 |
| 2011/0110599 A1* | 5/2011 | Sata | G06F 17/241 382/229 |
| 2011/0119047 A1* | 5/2011 | Ylonen | G06F 17/2785 704/9 |
| 2014/0188456 A1* | 7/2014 | Rylov | G06F 17/2735 704/9 |
| 2014/0201702 A1* | 7/2014 | Kaplinger | G06F 8/76 717/101 |
| 2014/0278405 A1* | 9/2014 | Peters | G06F 16/345 704/235 |
| 2015/0127323 A1* | 5/2015 | Jacquet | G06F 17/271 704/9 |

OTHER PUBLICATIONS

Dec. 3, 2013, U.S. Appl. No. 14/094,889, pending.
Sep. 18, 2014, U.S. Appl. No. 14/489,652, pending.

* cited by examiner

DETECTING LITERARY ELEMENTS IN LITERATURE AND THEIR IMPORTANCE THROUGH SEMANTIC ANALYSIS AND LITERARY CORRELATION

CROSS-REFERENCE TO RELATED APPLICATIONS CLAIMING BENEFIT UNDER 35 U.S.C. 120

This is a continuation application of U.S. patent application Ser. No. 14/094,889, filed on Dec. 12, 2013, by Corville Orain Allen, et al., which is currently under Notice of Allowance.

FEDERALLY SPONSORED RESEARCH AND DEVELOPMENT STATEMENT

None.

MICROFICHE APPENDIX

Not applicable.

INCORPORATION BY REFERENCE

U.S. patent application Ser. No. 13/722,017, filed on Feb. 20, 2013, by Corville O. Allen, et al., is hereby incorporated by reference in its entirety.

FIELD OF THE INVENTION

The invention generally relates to systems and methods for automatically extracting plot and character elements from works of literature for the purposes of automating the summarization of literary elements and their importance to one or more users.

BACKGROUND OF INVENTION

In the context of the present disclosure and the related art, "works of literature" will be used to refer to textual writings which are readily encoded into computer files, such as ASCII text, ANSI text, Hypertext Transfer Markup Language (HTML), eXtensible Markup Language (XML), portable document format (PDF), word processor files (e.g. *.doc, *.docx, *.odt, *.wpd, etc.), ebook files and the like. The content of these files may represent digital novels, books, textbooks, reference books, poetry, lyrics, magazines, journals, short stories, catalogs, research papers, user manuals and the like, each of which may have a structural syntax such as a table of contents, and index, one or more chapters with one or more sections and subsections. These works will be referred to collectively as "digital literature" for the purposes of the present disclosure.

Many online services which provide access to digital literature, such as online book stores, online libraries and online research centers attempt to provide suggestions for similar literary works to users when they search for or purchase a particular literature item. Such recommendations can increase sales, improve customer affinity, and lead to better research of a subject matter.

SUMMARY OF EXEMPLARY EMBODIMENTS OF THE INVENTION

Automatic semantic analysis for characterizing and correlating literary elements within a digital work of literature is accomplished by employing natural language processing and deep semantic analysis of text to create annotations for the literary elements found in a segment or in the entirety of the literature, a weight to each literary element and its associated annotations, wherein the weight indicates an importance or relevance of a literary element to at least the segment of the work of literature; correlating and matching the literary elements to each other to establish one or more interrelationships; and producing an overall weight for the correlated matches.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
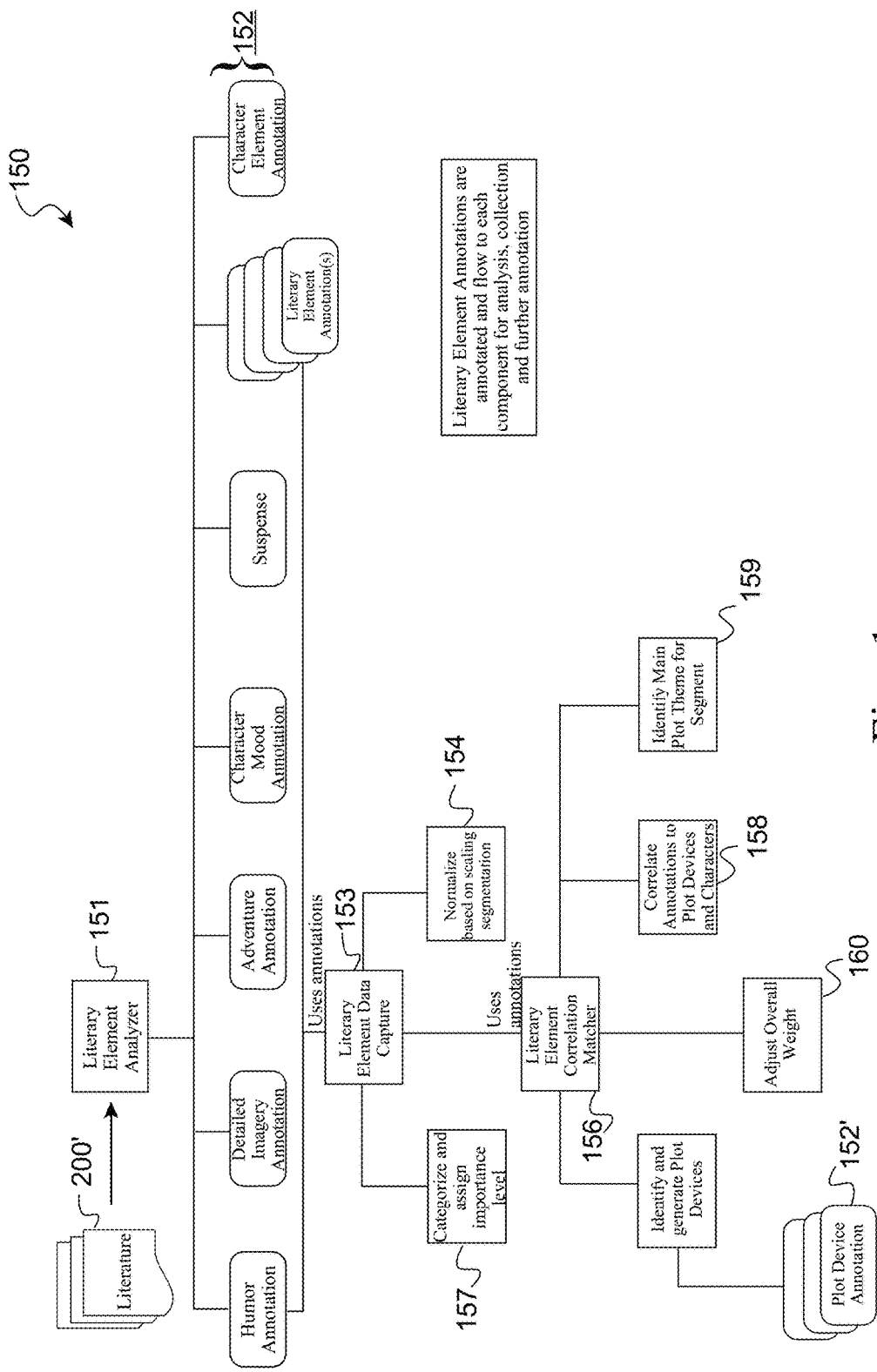
FIG. 1 illustrates an overall logical process according to the present invention.
Figure 2:
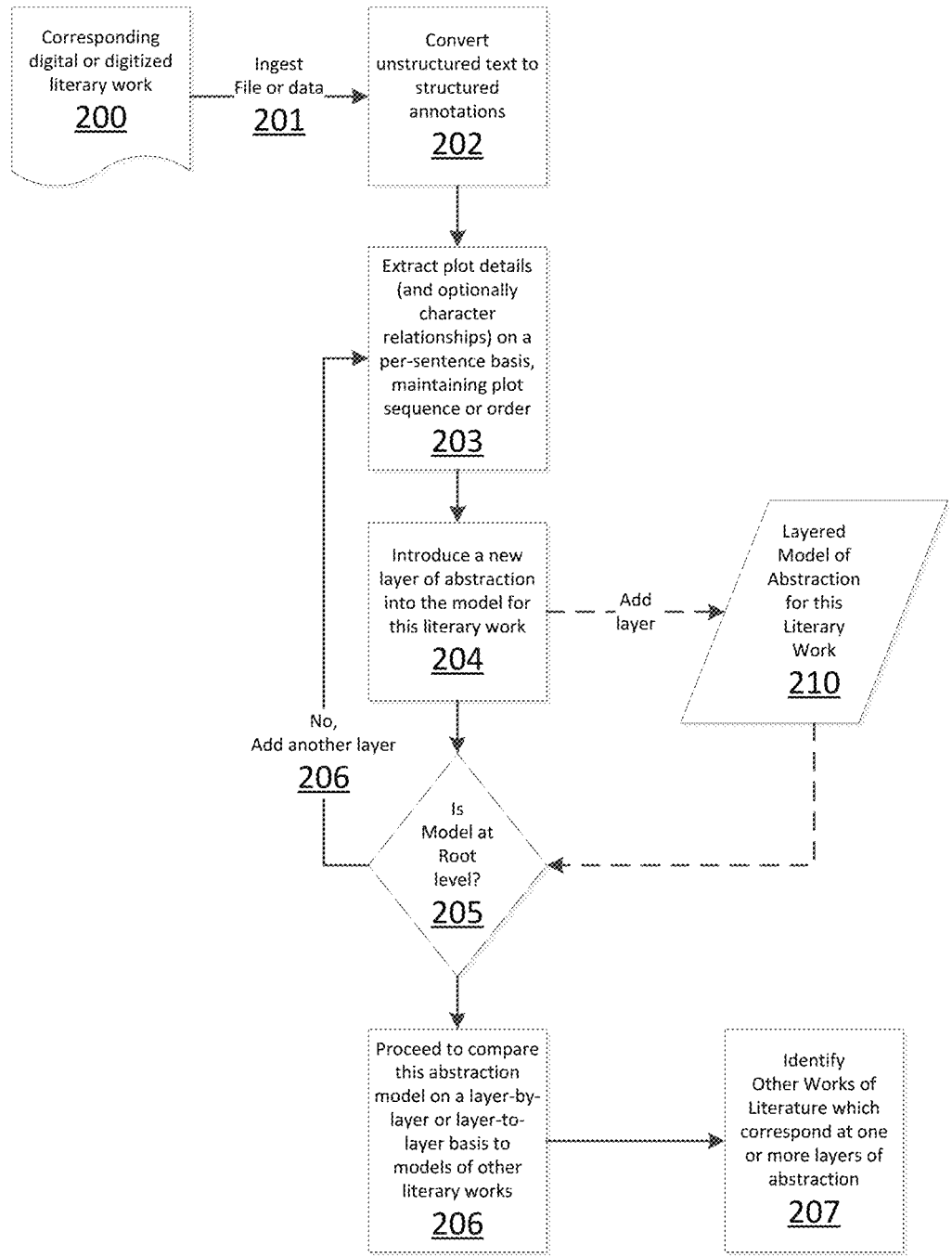
FIG. 2 provides additional details of a logical process according to the present invention for building a multi-layer abstraction model of the analyzed literary work.

The inventors of the present and the related invention have recognized problems not yet recognized by those skilled in the relevant arts. Today, analysis and comparison of two or more digital literary pieces is "shallow" and largely based on high level concepts, genres, or main plot elements. For example, a person that likes one suspense/thriller literary work is considered to be likely to be interested in other suspense/thriller literary works simply because they belong to the same genre of literature.

So, by "shallow", we mean analysis and subsequent comparison of literature pieces in the present art typically only extends to one level of analysis, namely genre. Thus, comparison of two pieces of literature according to shallow semantic analysis will also be shallow. In addition, analysis of plot elements within each work of literature requires considerable human effort to understand and comprehend the concepts of interest that make literary pieces similar to one another.

The present inventors have recognized these problems of manually-driven comparisons of literature, and, having reviewed the available technology to address the problem, have found no suitable, useful solutions. Thus, the present invention was developed, in conjunction with the related invention which is partially disclosed herein as a utility example of embodiments of the present invention.

The inventors further realized that the present-day methodology also fails to consider the nuances or deep semantics that make two literary pieces similar both conceptually and in writing style. And, in further consideration of the virtual explosion of digitally published pieces of literature, including digital books (eBooks), digital sheet music, web pages, blogs, self-published books, etc., the task of manually reading, comprehending, analyzing and comparing digital literature is rapidly becoming unwieldy, while customers of online digital literature expect instant access to similar works with little or no human input or wait time.

The invention disclosed herein addresses the current problems as well as addresses the future demands of such online systems for accessing, distributing, and purchasing digital literature.

Following the disclosure of illustrative embodiments of the present invention and that of the related invention, discussions of the reviewed available technologies and a comparisons to the presently-disclosed methods and systems are provided.

Literary Terminology

Terminology used in analysis and criticism of works of literature can be challenging to define in a precise manner. Many commonly used terms are subject to debate by scholars in this field, such as the precise meaning of "plot" or "character". Kathleen Morner and Ralph Rausch have stated in the forward of the NTC's Dictionary of Literary Terms (1998, McGraw-Hill) that such an effort to ascertain the exact meaning of a literary term can be a "vicious circle", wherein terms can be defined with respect to each other. Thus, literary terminology is context-dependent to a significant degree. The terminology used in the present disclosure will be used in a manner consistent with automated analysis of works of text, and in a manner which lends itself to computer and software design.

Deep Semantic Analysis of Natural Language Text in General

The term "deep semantic" relationships, for the purposes of the present disclosure, is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold (store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680). Another useful publicly-available document regarding realization of a general purpose automatic deep semantic analyzer of natural language text is described in "Deep Semantic Analysis of Text" by James F. Allen, et al., of the University of Rochester and the Institute for Human and Machine Cognition (document W08-0227 from the ACL).

So, while deep semantic analysis of natural language text in general has been discussed in the public domain, the inventors have discovered that the aforementioned problem of making an automated analysis of one or more works of literature, those presently engaged in the art appear to be focused on keyword searching and relevance ranking according to keywords. One approach to advancing beyond keyword searching is "intent-centric" processing as proposed by Scott Brave, et al., in WIPO patent application WO 2009/021198 A1. Inventors do not believe this approach, however solves the present problem because it addresses a different problem using a different approach without employing deep semantic analysis.

The present invention is set forth in at least one exemplary embodiment as an application of or manner of using a deep semantic analyzer platform. This platform may be a system such as the IBM Watson™ system, such as is described in "Building Watson: An Overview of the DeepQA Project" (Stanford University online, and AI Magazine, Fall 2010 issue). The foundation deep semantic analysis platform may be an alternate general-purpose deep semantic analyzer implementation such as the semantic extraction component of the system described by Anna Stavrianou in United States Pre-Grant Published Patent Application 2013/0218914 A1 (Aug. 22, 2013) suitably modified to include the functionality of the related, incorporated patent application and that described herein by the present inventors. Other useful, publicly-available teachings regarding the availability of general purpose deep semantic analyzers which may be suitable for adapting and improving to the present invention may include those described by Konstantin Zuev in United States Pre-Grant Published Patent Application 2011/0270607 A1 (Nov. 3, 2011); the Thompson's Motif-Index Literature system of Thiery Declerk, et al., as published in "Research and Advanced Technology for Digital Libraries: Lecture Notes in Computer Science", vol. 6966, 2011, pp. 151-158; and using natural language parsers such as that described by Sala Ait-Mokhtar, et al., in U.S. Pat. No. 7,058,567 (Jun. 6, 2006).

One may contrast deep semantic relationships with shallow semantic relationships, that latter of which usually only consider the structure of parts of speech within a sentence, and not necessarily the meanings of those words. An example shallow relationship may simply be of the form sentence (subject, verb, object). In the above example, this would be sentence (john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

Deep Semantic Analysis of Digital Works of Literature to Solve the Presently Addressed Problem The present inventors have recognized that currently there appears to be no effective technology to conveniently and easily know what type of content is contained in a digital work of literature, such as a novel, a book or an article) and the way in which certain literary elements flow throughout the work of literature. From the designation of its genre, one may glean a general understanding of its overall subject matter, such as science fiction, suspense, or drama, and one may further get a general understanding of its plot and character content based on other users' reviews about the work of literature. But, one may only rarely get to a deeper understanding of the writing style within the work of literature, or of the literary elements within the storyline.

For example, one may not easily or often gain an understanding of degree of a characteristic in a work of literature, such as "how humorous", "how descriptive", and "how descriptive" certain elements are presented (e.g. settings, characters, locations, foods, mind-sets, etc.). Further to these shortcomings in the art, the present inventors have recognized that there doesn't seem to be technology to assist in quickly gauging how these elements play out in segments in the work of literature, and whether the literary elements are prevalent throughout the work of literature and how or if these elements would match one's own reading interests.

The present inventors have recognized that current art only provides online reviews written by other readers as the only reasonable way to get somewhat accurate understanding of a book, such as Cliff Notes™, NY Times™ reviews, or other readers' reviews. Typically, one must read the several available reviews, and manually collate the reviews by pulling information from the other readers. None of these sources of review have easy ways to discern this information by processing the book content in some automated or reliable fashion.

Upon recognition of these unmet needs in the art and these problems, the present inventors have set out to develop a tool which allows a person (or another system) to get a representation and information of the literary elements, tone, flow and content type of a work of literature, including, preferably, indications of where or how these elements may fluctuate throughout the work of literature, and how prevalent each element is in the work of literature.

Such a tool would be useful to assist people to better understand what kind of literature a particular work likely is, and the how much certain types of literary elements make up the book or other work of literature.

Overview of the Processes According to the Present Invention

A fundamental operation of the present invention is to detect, identify and categorize various narrative characteristics within a digital work of literature by analyzing and capturing the literary elements it contains, the levels of detail and likely interesting categories (from the perspective of a particular user) of data found in the work of literature. The generalized logical processes yield a literary metadata scale built from the analysis of the text across plot themes, with or without categories, to identify key literary elements and their impact on the overall literature through their consistency, occurrence and importance to the literary art.

Further, with respect to analysis of a novel, the literary elements and the metadata may comprise, but are not limited to, elements such as humor, suspense, adventure, detailed description of setting (imagery), character mood and a measure or degree of how prevalently these elements permeate throughout the work of literature, as well as a measurement of the ebb and flow of these elements in the plot by weight value. The prevalence degree is determined by the detected relevance of each literary element, especially relative to their deep relationships to the detected main characters and plot points within the story.

The identification of plot devices, such as introduction of characters, major events (death, celebration, marriage, war, etc.) and their relative importance and re-occurrence throughout the work of literature is also analyzed in order to provide information on how and when various parts of the storyline are advanced.

Still further, when it comes to literary works such as articles (e.g. medical journal, experiments and evidence, etc.), the literary element categories are flexible in such that they are used to identify key categories, and their relevance to the type of article and their occurrence and importance throughout the literature.

One particular advantage of using a tool such as those described herein is providing a user an ability to clearly identify, relate and show the importance of these literary elements within the work of literature in order for the user to easily and conveniently see the make-up in general of a book or novel, to know where those elements exist, and to understand the strength of those elements in relation to the literature and category.

Another advantage of using a tool such as described herein is that by using this information, publishers and authors may also gain an improved understanding of the make-up of a work of literature that they are writing or publishing so that they may make adjustments to the content to suit their potential readers interests better. This data set can be used in various ways in the literary field for publishers, authors, visualization tools, comparisons, identification of for those elements.

Such a tool can be offered as a service that consumers, publishers, authors and book-sellers can use to improve general access to book characteristics, reader interests and to be able to make smart recommendations for users and potential literature consumers.

Current Invention's Utility in a Larger Architecture

Figure 4:
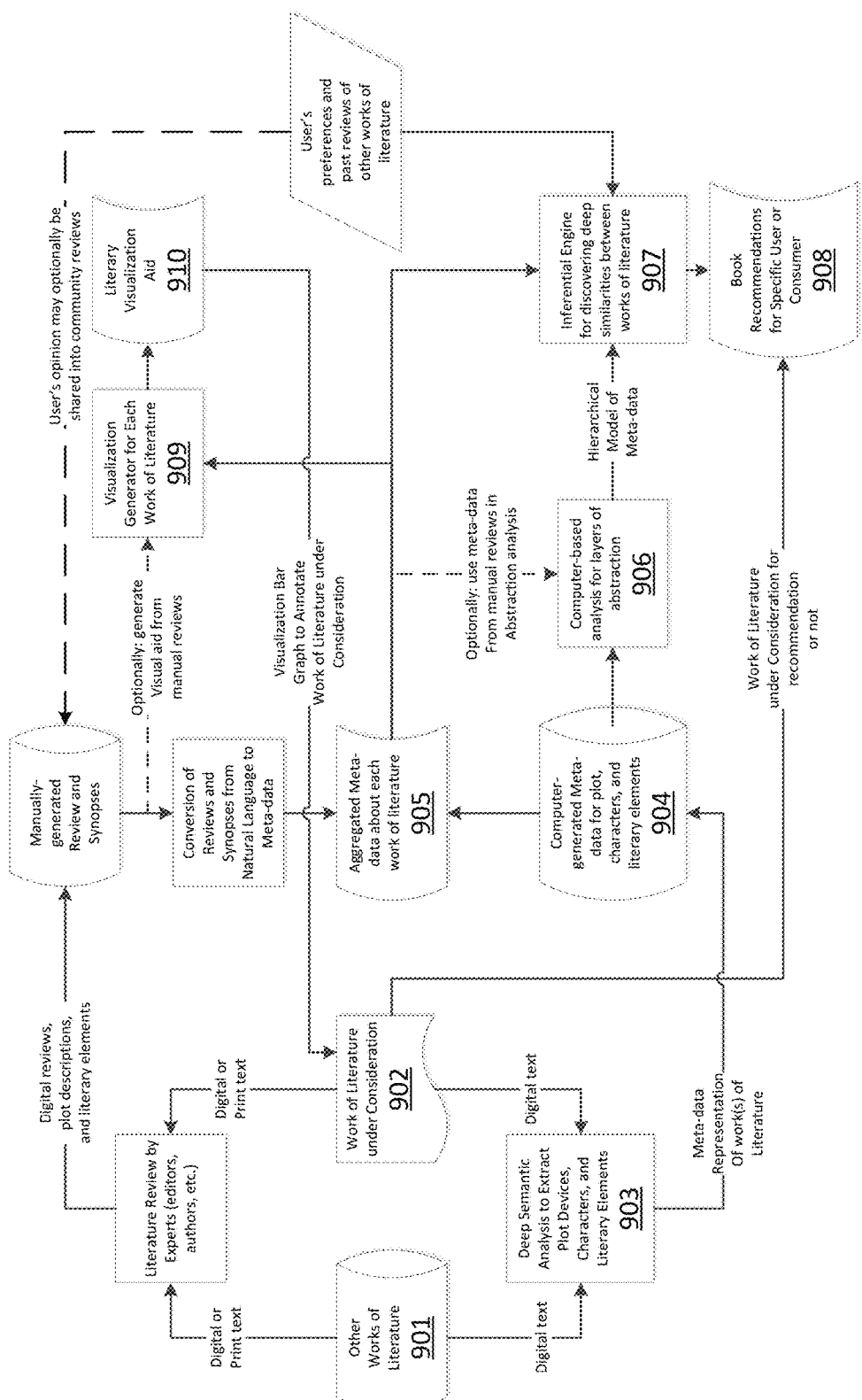
FIG. 4 depicts an arrangement of components and functions in which embodiments of the present invention will find utility.

The invention disclosed herein and several related inventions, also disclosed in U.S. patent applications by the same inventors, optionally fit within a larger architecture for literature analysis, recommendation and annotation. Turning to FIG. 4, such an arrangement of components and elements is shown. A work of literature under consideration (902) and optionally one or more other works of literature (901) may be subjected to deep semantic analysis to extract characters, their relationships to each other and plot events, as well as other literary elements such as elements (and significance or intensity) of humor, mystery, drama, scenery, etc. One such automated deep semantic analysis process is described in a related patent application by the present inventors.

Meta-data representing the results of this analysis is stored (904), and optionally aggregated (905) with metadata which is converted from manually-created descriptions of the works of literature, such as reviews, Cliff™ notes, condensed versions of the works, etc.

In one manner of using this metadata, which is disclosed in another related patent application, the meta-data may be further analyzed and organized (906) into hierarchical layers of abstraction to allow ready comparison with other works of literature via their abstracted metadata representations.

In another manner of using this metadata (904) which is disclosed in another related patent application, the computer-generated meta-data, or the meta-data converted from manually-generated reviews, or a combination (905) of both, is analyzed to generate (909) a visualization of the work of literature (910) which relates segments of the literature to plot events and intensity or significance of the literary elements (humor, mystery, scenery, etc.). This visualization (910) may then be used to annotate the work of literature (902) that it represents, such as printing it on the back cover of the paper book or displaying it relative to the digital book on a web page.

Another related invention for which another patent is pending by the same inventors involves another use of this metadata, and optionally uses the abstracted modeling process (disclosed in another related patent application). According to embodiments of this related invention, the meta-data and models may be used by an inferential engine (907) to discover deep similarities between two or more works of literature, and to yield one or more recommendations (908) to a potential consumer. The potential consumer's preferences may also optionally be factored into the inferential engine's analysis, as is disclosed in the related patent application.

Structured Annotations

For the following logical processes, the term "structured annotations" will refer to at least one available embodiment of metadata (data about data), such as the annotations generated by the present invention of the following paragraphs. According to this exemplary embodiment, the structure annotation constitutes information regarding where that data can be found in a given passage or text, and contains the raw value of the selected text, keywords or terms. It usually has a preferred or interpreted value for the term, usually also contains further metadata describing that term in a specific context. For example, the text "Peter" may be designated as an annotation with metadata: Noun—parts of speech, Lead Character, Brother to Kayla.

Another example, the text "Sam and Sarah felt anguish over the loss of the wood" may be denoted as the raw value of an annotation, with metadata "Sadness", where the term "sadness" is derived from the deep semanic analysis of the text to not only parse the phrase for structure, but also determine the meaning of the words.

Logical Processes According to the Present Invention

The present invention may be realized as a processor executing certain program instructions (program code), or as a customized electronic circuit device, or as a combination of processor, instructions, and custom circuits.

Turning to FIG. 1, such a logical process (150) is shown, in which there are three main components:
(1) a Literary Element Analyzer (151);
(2) a Literary Element Data Capturer (153); and
(3) a Literary Element Correlation Matcher (156).

The Literary Element Analyzer preferably receives one or more digital works of literature (200'), and employs natural language processing and deep semantic processing and a type system around literary terms and corpora that identifies categories of literary terms and annotators to match, identify and annotate (152) the literary elements with information.

The Literary Element Data Capturer attaches and augments the resulting annotations (152) of the Literary Element Analyzer by assigning (155) a basic level and weight normalized (154) by scale of the segment of the work of literature (e.g. by chapter, by passage, etc.).

The Literary Element Correlation Matcher receives the Literary Element Annotations, analyzes and correlates (158) them to create (157) plot devices (152') and character associations. Then, the Literary Element Correlation Matcher augments character elements regarding shifts in the plot (e.g. at plot event and plot devices), including identifying plot themes (159) based on the frequency and scaling of the themes, and augments the annotations and based on their occurrences, weights and importance levels. Next, the Literary Element Correlation Matcher assigns an overall weight (160) by combining the set of annotations around that specific annotation and its metadata.

The information annotated is specific to the set of literary elements required in that analysis, whether it's a novel or evidence for oncology, etc. For example, in analysis of a novel, one embodiment for detecting humor in a chapter may proceed as follows:

(1) annotate and identify words associated with humor, such as laugh, guffaws, smiled/smiling, grin, and certain key relationships such as "corner of mouth turns up" into a synonym table and mapping to a language ware based model for humor (e.g. these associated words and terms may be stored in a thesaurus, sorted or indexed by their more general terms, such as humor (laugh, guffaw, grin, smile, chuckle, . . . ) and anger (yell, scream, grimmace, scowl, furious, angry, mad, put_off, irritated, . . . ));

(2) calculate a confidence level and a weight towards how much humor exists by the number of participants, and the type of writing style used to determine and how strong the language was (e.g. a smile may be considered a subtle humor, while a guffaw would carry more weight, such as by adding strength values to each entry in the thesaurus, e.g. humor (bursts_out (10), laugh (7), guffaw (9), grin (2), smile (2), chuckle (3), . . . )); and (3) modifying each literary element annotation for humor with metadata by the Literary Element Data (metadata) Capturer, such as the following embodiment shown in eXentisible Markup Language or XML):

```
<humor_element> Humor_Annotation
    <humor_tone> 1:10 </humor_tone>
    <humor_type> Malapropism:Pun:Polemics:. ..
    </humor_type>
    <humor_relationships>
        character1:character2:...
    </humor_relationships>
    <humor_weight> 1:10 </humor_weight>
</humor_element>
```

For example, a method to detect a malapropism type of humor that would operate on the following except sample text:

John says, "Texas has a lot of electrical votes!"
Mark looks at him and bursts out laughing.
John says, "Oh, I mean electoral votes".

First, deep semantic relationship would detect a humor element (laughing) with a strong weight (bursts out), as well as the relationship to two characters (John and Mark). To identify the type of humor element, the analysis back traces and analyzes the subset of text prior to the "Mark laughs" by paragraph(s) and after "Mark Laughs" for entire paragraph, and by performing fact check Noun, possessive verb, and subject. A correction (electoral substituted for electrical) by any of the participating characters denotes malapropism.

Next, a deep semantic analysis process develops an identifiable pattern for a malapropism that can be learned and fed into the analysis system:

Noun, possessive verb, subject followed by laughter, check for correction, check against facts, and substitute with homophones, synonyms or frequently misused terms.

Additional methods to detect other types of humor elements may be included in the logical processes, as well, such as a method to detect a pun (deliberate misuse of a term or a syntactical double entendre), or to detect a polemical statement (use of words associated with political discussion or with critical statements but followed by an indication of laughter or amusement).

Segmentation

In one available embodiment, the work of literature is broken into segments based on the length of the work (e.g. books, chapters, sections), and optionally according to themes (preface, introduction, main body, exercises, worksheets, glossary, index, etc.), depending on a pre-analysis of the book which is described in further detail in the following paragraphs. For example, a book may be broken into sections roughly of equal sizes (equal page count, equal word count, etc.), based on the total length of the book, with no more than 4 or 5 sections. The sections are normalized based on the scale of the book number of pages and the way the graphical scale should be, not based on the number of entries for a large book.

The Literary Element Correlation Matcher then can receive the metadata and then scales the information and literary element categories, and matches these and their importance levels across the sections by interested literary terms.

Consider this example for a Literary Element for dominant literary genre of "adventure". A particular section of the book under analysis deals with discovery of new areas, new items, new techniques and character growth and knowledge increases in a new domain, so metadata (not shown in XML) may consist of:

Adventure Annotation
    Adventure Level—1-10
    Type (Discovery, Knowledge, Area, Excitement, Danger, Risk)
    Relationships—Main character(s), Main Plot Element
    Overall Weight 1-10

A method for identifying and associating important or main characters is, including but not limited to, by detecting the frequency of the character names or the point of view or perspective of the author. For example, most of the main characters' names will occur much more frequently through the work of literature, and minor or incidental character names may occur relatively less frequently. One exception may be a narrator, whose name may appear seldom or not at all, but this can be determined by detecting that the story is told in a first-person narrative style. An annotation for each character might appear as such (not shown in XML):

Character Annotation
    Character Importance 1-10
    Type (Main, Important, Protagonist, Supporting Character)
    Relationships—Main Character, Main Plot Element
    Overall Weight 1-10

A method to break the work of literature into segments can be intelligent, such as these example rules or processes:
    break it up based on chapters;
    break it up based on the character perspective;
    break it up according to fixed length (e.g. X words, Y pages, Z sentences) or by proportional length ($1/n^{th}$ of total length of the work of literature), optionally with breaks rounded to the nearest significant change (chapter end, page end, paragraph end, etc.)

An example method for detecting and annotating descriptive details around elements such as environment settings, food, and emotional states might employ rules or processes such as:
    analyze sentences for noun and subjects, and identify and categorize nouns into places, foods, and characters;
    analyze verbs used in the sentences and whether they are descriptive verbs, action verbs, or passive verbs;
    identify adjectives and adverbs in the sentences and their relationships to the nouns of focus;
    identify and note the concentration of the descriptive elements in relation to the nouns and their relationships to the detected main characters; and
    note the reactions (mood indicators) of main and important characters to the descriptive elements (the same type of reaction should be evoked in the reader—laughing, crying, surprise, disappointment, bewilderment, etc.).

An example Descriptive Element Annotation may be as follows (not expressed in XML):
    Descriptive Element Annotation
    Description level 1-10 (augmented by type of adjectives and adverbs)
    Type (Food, Emotional State, Environment, Culture, Persona)
    Relationships (Main Character, Environment, Culture, Plot Theme)
    Overall Weight 1-10

A method for identifying plot devices in a work of literature may be as follows:
    detect a set of actions taken by a main character or a set of actions affect main and important characters;
    assign and categorize the action(s) to one or more events;
    note and capture instructions or tasks assign to main character (Quests), which can be by the character or supporting characters, or they can be driven by the main plot theme;
    track when actions change main events or when events complete a task or when plot themes shift; and
    aggregate these detected plot elements into a set of completed quests and assign a significance value to the set of items generating a plot device.

The annotation for plot devices may include (not expressed in XML):
    Plot Device Annotation
    Plot Device Level 1-10
    Type (Travel, Quest Achieved, Character Persona Change, Death, New Character, New Location)
    Relationship (Main Character, Important Character, Plot Theme)
    Overall Weight 1-10

Utility Example

The machine-generated metadata of the present invention may be output to an abstraction analyzer (906), or to an inferential engine for discovering deep similarities (907) for the purposes of making recommendations via a recommendation engine (908), or to a visualization generator (909, 910), or to any combination of these, as shown in FIG. 4.

For the first example of outputting the metadata model to an abstraction analyzer (906) to illustrate the usefulness of the metadata model, one may refer to the related U.S. patent application Ser. No. 13/772,017, filed on Feb. 20, 2013 which discloses a method or process of decomposing a digital literary piece into deep semantic relationships at varying levels of abstraction, wherein the first level of abstraction captures as many plot elements as possible, and wherein each subsequent level represents further abstraction of storyline or plot details, until high level concepts begin to emerge. From this semantic analysis, user sentiment to the literary attributes are inferred and used to identify similar literature at varying levels of abstraction and detail.

The method of this particular related invention is advantageous because it performs deep semantic analysis of literature at varying levels of abstraction. Doing so allows two pieces of digital or digitized literature to be compared to each other at varying levels of semantic analysis, offering a deep or shallow comparison as desired. An additional benefit of the related method is that the current methods focus on shallow semantic analysis, which simply understands similarity of patterns and words as they appear in the text. The disclosed system employs deep semantic analysis, which analyzes the concepts of the text at a deeper level than pattern and term or key word matching.

Such a method can necessarily benefit from the previously-described processes to detect literary elements, weight them, and relate them to characters and to plot devices. The related invention is disclosed herein as an example of how the present invention may be used in at least one extended application of the new technology.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
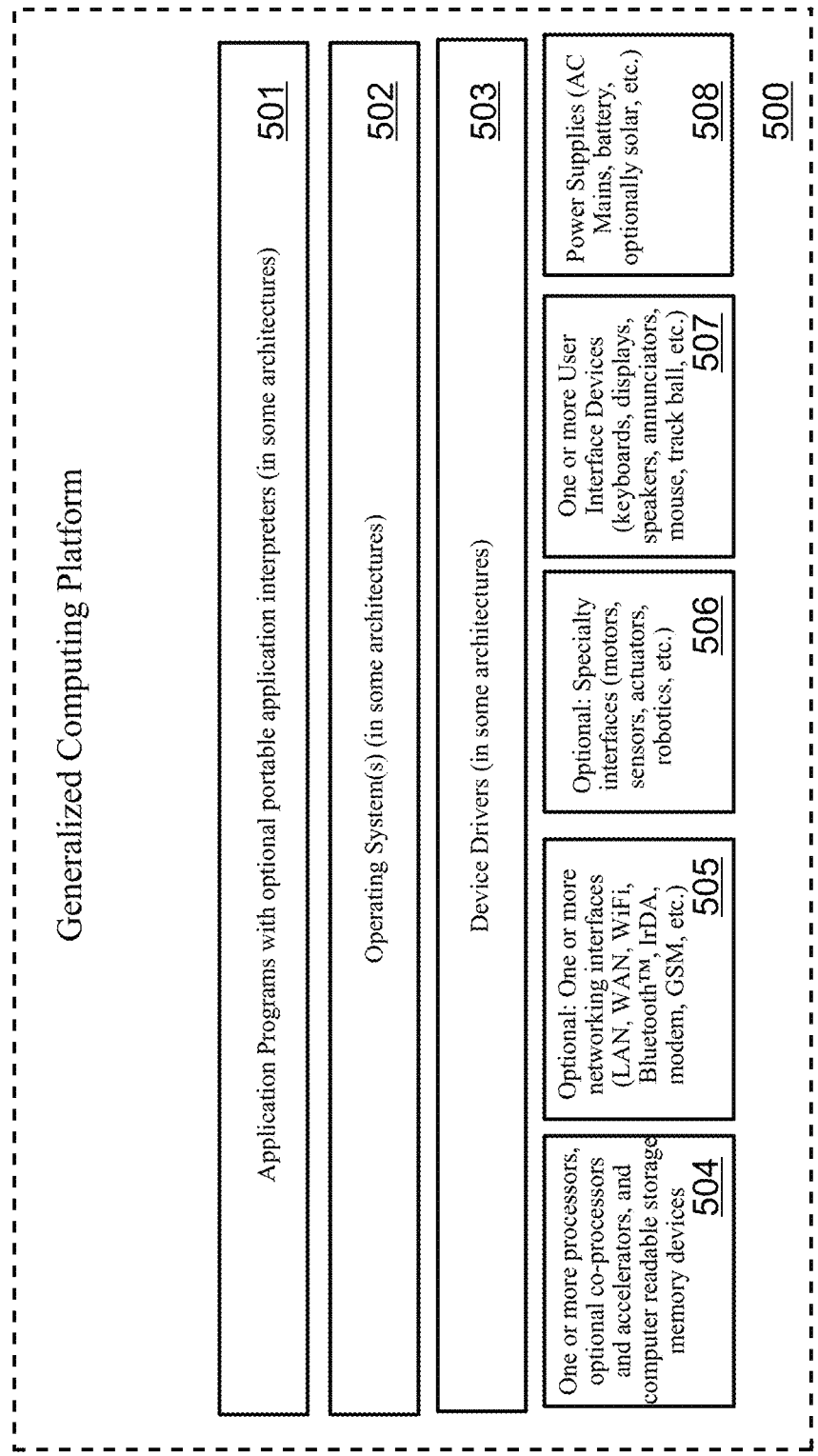
FIG. 3 illustrates a generalized computing platform suitable for combination with program instructions to perform a logical process such as shown in FIG. 2 to yield a computer system embodiment according to the present invention.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:

creating one or more digital annotations, by a computer processor, using natural language processing and deep semantic processing, for one or more non-plot device literary elements interrelated with one or more plot devices within a literary plot in a digital work of literature, wherein the one or more plot devices are distinguished from a general theme and a general plot;

assigning, by a computer processor, weights to the one or more created annotations according to an importance level and a relevance level of each created annotation as determined by computer-performed deep semantic analysis;

identifying, by a computer processor, a shift within the literary plot for one or more of the plot devices;

augmenting, by a computer processor, the importance level and the relevance level associated with each respective annotated interrelationship to yield an overall weight for each of the interrelationships before, after or between the shift within the literary plot; and producing, by a computer processor, an output depiction, on a user interface device, the annotations, the interrelationships, and the overall weights.

2. The method as set forth in claim 1 further comprising assigning interrelationships and type characteristics by correlating and matching the non-plot device literary elements and the plot devices, and wherein the augmenting to yield the overall weight comprises assigning overall weights to one or more correlated and matched literary elements.

3. The method as set forth in claim 2 wherein the correlating and matching comprises assigning, by a computer processor, to each literary element, one or more attributes selected from the group consisting of level of importance within the segment, level of prevalence within the segment, number of parties in a relationship to which the literary element pertains in the segment, and number of plot devices in the segment to which the literary element pertains.

4. The method as set forth in claim 3 wherein the correlating and matching further comprises calculating a segment-bound overall weight for a literary element within the segment by applying a mathematical weighting function to the one or more attributes.

5. The method as set forth in claim 4 wherein the correlating and matching further comprises calculating an overall weight for a literary element within a plurality of segments by applying a mathematical weighting function to one or more segment-bound overall weights.

6. The method as set forth in claim 3 wherein the correlating and matching further comprises calculating an overall weight for a literary element within the entire digital work of literature by applying a mathematical weighting function to the one or more attributes.

7. The method as set forth in claim 1 wherein the created annotations include one or more annotations selected from the group consisting of humor, imagery, adventure, character, character mood, and suspense.

8. The method as set forth in claim 7 wherein the humor annotation is further classified as a type of humor selected from the group consisting of malapropism, pun, polemics, dark, silly, political, genderist, sarcasm, epigrammatic, exaggeration, irony, situational, and satire.

9. The method as set forth in claim 1 wherein at least one literary element annotation weight is normalized across a category in which the literary element has been categorized.

10. The method as set forth in claim 1 wherein at least one literary element weight is normalized across a segment of the digital work of literature in which the literary element is found.

11. The method as set forth in claim 1 further comprising automatically breaking, by a computer system, the digital work of literature into segments.

12. The method as set forth in claim 11 wherein the breaking into segments is performed according to one or more rules selected from the group consisting of proportionally dividing the digital work of literature into a fixed number of segments and dividing the digital work of literature into segments according to fixed lengths of the segments.

13. A computer program product comprising:
a tangible, computer readable memory device; and
program instructions encoded by the computer readable memory device for causing one or more processors to perform operations of:
creating one or more digital annotations, using natural language processing and deep semantic processing, for one or more non-plot device literary elements interrelated with one or more plot devices within a literary plot in a digital work of literature, wherein the one or more plot devices are distinguished from general theme and general plot;
assigning weights to the one or more created annotations according to an importance level and a relevance level of each created annotation as determined by computer-performed deep semantic analysis;
identifying a shift within the literary plot for one or more of the plot devices;
augmenting the importance level and the relevance level associated with each respective annotated interrelationship to yield an overall weight for each of the interrelationships before, after or between the shift within the literary plot; and
producing an output depiction, on a user interface device, the annotations, the interrelationships, and the overall weights.

14. The computer program product as set forth in claim 13 wherein the encoded program instructions are further for assigning interrelationships and type characteristics by correlating and matching the non-plot literary elements and the plot devices, and wherein the augmenting to yield the overall weight comprises assigning overall weights to one or more correlated and matched literary elements.

15. The computer program product as set forth in claim 13 wherein the encoded program instructions are further for:
automatically breaking the digital work of literature into segments according to one or more rules selected from the group consisting of proportionally dividing the digital work of literature into a fixed number of segments and dividing the digital work of literature into segments according to fixed lengths of the segments;
calculating a segment-bound overall weight for a literary element within the segment by applying a mathematical weighting function to the one or more attributes; and
calculating an overall weight for a literary element within a plurality of segments by applying a mathematical weighting function to one or more segment-bound overall weights.

16. A computer system comprising:
a processor and a tangible, computer readable memory device; and
program instructions encoded by the computer readable memory device for causing the processor to perform operations of:
creating one or more digital annotations, using natural language processing and deep semantic processing, for one or more non-plot device literary elements interrelated with one or more plot devices within a literary plot in a digital work of literature, wherein the one or more plot devices are distinguished from general theme and general plot;
assigning weights to the one or more created annotations according to an importance level and a relevance level of each created annotation as determined by computer-performed deep semantic analysis;
identifying a shift within the literary plot for one or more of the plot devices;
augmenting the importance level and the relevance level associated with each respective annotated interrelationship to yield an overall weight for each of the interrelationships before, after or between the shift within the literary plot; and
producing an output depiction, on a user interface device, the annotations, the interrelationships, and the overall weights.

17. The computer system as set forth in claim 16 wherein the encoded program instructions are further for assigning interrelationships and type characteristics by correlating and matching the non-plot literary elements and the plot devices, and wherein the augmenting to yield the overall weight comprises assigning overall weights to one or more correlated and matched literary elements.

18. The computer system as set forth in claim 16 wherein the encoded program instructions are further for:
- automatically breaking the digital work of literature into segments according to one or more rules selected from the group consisting of proportionally dividing the digital work of literature into a fixed number of segments and dividing the digital work of literature into segments according to fixed lengths of the segments;
- calculating a segment-bound overall weight for a literary element within the segment by applying a mathematical weighting function to the one or more attributes; and
- calculating an overall weight for a literary element within a plurality of segments by applying a mathematical weighting function to one or more segment-bound overall weights.

\* \* \* \* \*